United States Patent
Srivastav et al.

(10) Patent No.: US 10,496,671 B1
(45) Date of Patent: Dec. 3, 2019

(54) ZONE CONSISTENCY

(71) Applicant: EMC Corporation, Hopkinton, MA (US)

(72) Inventors: Shashwat Srivastav, Seattle, WA (US); Sriram Sankaran, Redmond, WA (US); Subba Gaddamadugu, Westborough, MA (US); Peter Musial, Arlington, MA (US); Andrew Robertson, Washington, DC (US); Huapeng Yuan, Seattle, WA (US); Qi Zhang, Redmond, WA (US); Jun Luo, Bellevue, WA (US); Vishrut Shah, Redmond, WA (US); Chen Wang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 188 days.

(21) Appl. No.: 14/319,113

(22) Filed: Jun. 30, 2014

Related U.S. Application Data

(60) Provisional application No. 61/988,796, filed on May 5, 2014, provisional application No. 61/988,603, filed on May 5, 2014.

(51) Int. Cl.
*G06F 16/27* (2019.01)

(52) U.S. Cl.
CPC .......... *G06F 16/273* (2019.01); *G06F 16/275* (2019.01)

(58) Field of Classification Search
CPC ......... G06F 17/30578; G06F 17/30581; G06F 17/30174; G06F 17/30575; G06F 17/30179; G06F 17/30569
USPC .......... 707/611, E17.22; 711/108, 114, 165; 714/4.11, E11.101, E11.107
See application file for complete search history.

(56) References Cited

U.S. PATENT DOCUMENTS

| | | | | |
|---|---|---|---|---|
| 5,581,753 A | * | 12/1996 | Terry | G06F 17/30371 |
| 6,173,377 B1 | * | 1/2001 | Yanai | G06F 3/0601 |
| | | | | 711/154 |
| 8,046,551 B1 | * | 10/2011 | Sahin | G06F 11/2074 |
| | | | | 711/162 |
| 8,396,840 B1 | * | 3/2013 | McHugh | G06F 3/0617 |
| | | | | 707/689 |
| 2005/0160248 A1 | * | 7/2005 | Yamagami | G06F 3/0619 |
| | | | | 711/170 |
| 2008/0244035 A1 | * | 10/2008 | Horie | G06F 3/0613 |
| | | | | 709/217 |
| 2009/0313311 A1 | * | 12/2009 | Hoffmann | G06F 11/2097 |
| 2010/0174731 A1 | * | 7/2010 | Vermeulen | G06F 17/30212 |
| | | | | 707/758 |
| 2011/0099146 A1 | * | 4/2011 | McAlister | G06F 11/3006 |
| | | | | 707/634 |
| 2012/0166394 A1 | * | 6/2012 | Kim | G06F 17/30575 |
| | | | | 707/634 |

(Continued)

*Primary Examiner* — Jeff A Burke
*Assistant Examiner* — Kamal K Dewan
(74) *Attorney, Agent, or Firm* — Daly, Crowley, Mofford & Durkee, LLP

(57) ABSTRACT

A computer implemented method, system, and computer program product for enabling strong consistency of unique objects between zones comprising enabling consistency of an unique data object between in zones by switching between consistency techniques to keep the unique data object consistent between the zones; wherein read and write access is enabled to the unique object in the zones.

20 Claims, 14 Drawing Sheets

(56) References Cited

U.S. PATENT DOCUMENTS

| | | | |
|---|---|---|---|
| 2012/0233463 A1* | 9/2012 | Holt | G06F 17/30575 713/168 |
| 2012/0233490 A1* | 9/2012 | Barton | H04L 67/1095 713/503 |
| 2012/0265742 A1* | 10/2012 | Burckhardt | G06F 9/466 707/694 |
| 2012/0303576 A1* | 11/2012 | Calder | G06F 11/2076 707/611 |
| 2013/0339407 A1* | 12/2013 | Sharpe | G06F 3/0611 707/827 |
| 2014/0006354 A1* | 1/2014 | Parkison | G06F 3/0611 707/649 |
| 2014/0006465 A1* | 1/2014 | Davis | G06F 16/182 707/827 |
| 2015/0026128 A1* | 1/2015 | Drobychev | G06F 17/30575 707/634 |
| 2015/0046395 A1* | 2/2015 | Rath | G06F 17/30578 707/623 |

* cited by examiner

ZONE CONSISTENCY

RELATED APPLICATIONS

This Application claims priority from U.S. Provisional Patent Application Ser. No. 61/988,603 entitled "DISTRIBUTED DATA STORAGE MANAGEMENT" and 61/988,796 entitled "ZONE CONSISTENCY" filed on May 5, 2013 the content and teachings of which are hereby incorporated by reference in their entirety.

This Application is related to U.S. patent application Ser. No. 14/319,349 entitled "DISTRIBUTED DATA STORAGE MANAGEMENT" Ser. No. 14/319,360 entitled "DISTRIBUTED METADATA MANAGEMENT" Ser. No. 14/319,368 entitled "SCALABLE DISTRIBUTED STORAGE SYSTEM INFRASTRUCTURE", Ser. No. 14/319,378 entitled "DISTRIBUTED DATA STORAGE MANAGEMENT", Ser. No. 14/319,383 entitled "DATA BACKUP MANAGEMENT ON DISTRIBUTED STORAGE SYSTEMS", and Ser. No. 14/319,317 entitled "ZONE CONSISTENCY" filed on even date herewith, the teachings of which applications are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application related to data storage.

BACKGROUND

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein. In a common implementation, a Storage Area Network (SAN) is used to connect computing devices with a large number of storage devices. Management and modeling programs may be used to manage these complex computing environments.

Two components having connectivity to one another, such as a host and a data storage system, may communicate using a communication connection. In one arrangement, the data storage system and the host may reside at the same physical site or location. Techniques exist for providing a remote mirror or copy of a device of the local data storage system so that a copy of data from one or more devices of the local data storage system may be stored on a second remote data storage system. Such remote copies of data may be desired so that, in the event of a disaster or other event causing the local data storage system to be unavailable, operations may continue using the remote mirror or copy.

In another arrangement, the host may communicate with a virtualized storage pool of one or more data storage systems. In this arrangement, the host may issue a command, for example, to write to a device of the virtualized storage pool. In some existing systems, processing may be performed by a front end component of a first data storage system of the pool to further forward or direct the command to another data storage system of the pool. Such processing may be performed when the receiving first data storage system does not include the device to which the command is directed. The first data storage system may direct the command to another data storage system of the pool which includes the device. The front end component may be a host adapter of the first receiving data storage system which receives commands from the host. In such arrangements, the front end component of the first data storage system may become a bottleneck in that the front end component processes commands directed to devices of the first data storage system and, additionally, performs processing for forwarding commands to other data storage systems of the pool as just described.

As it is generally known, "cloud computing" typically refers to the use of remotely hosted resources to provide services to customers over one or more networks such as the Internet. Resources made available to customers are typically virtualized and dynamically scalable. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (aka "tenants") improves resource utilization. Use of the cloud computing service model has been growing due to the increasing availability of high bandwidth communication, making it possible to obtain response times from remotely hosted cloud-based services similar to those of services that are locally hosted.

Cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation," a program running in one virtual machine is completely isolated from programs running on other virtual machines, even though the other virtual machines may be running on the same underlying hardware. In the context of cloud computing, customer-specific virtual machines can therefore be employed to provide secure and reliable separation of code and data used to deliver services to different customers.

BRIEF DESCRIPTION OF THE DRAWINGS

Features and advantages of the present invention will become more apparent from the following detailed description of exemplary embodiments thereof taken in conjunction with the accompanying drawings in which.

SUMMARY

Figure 1:
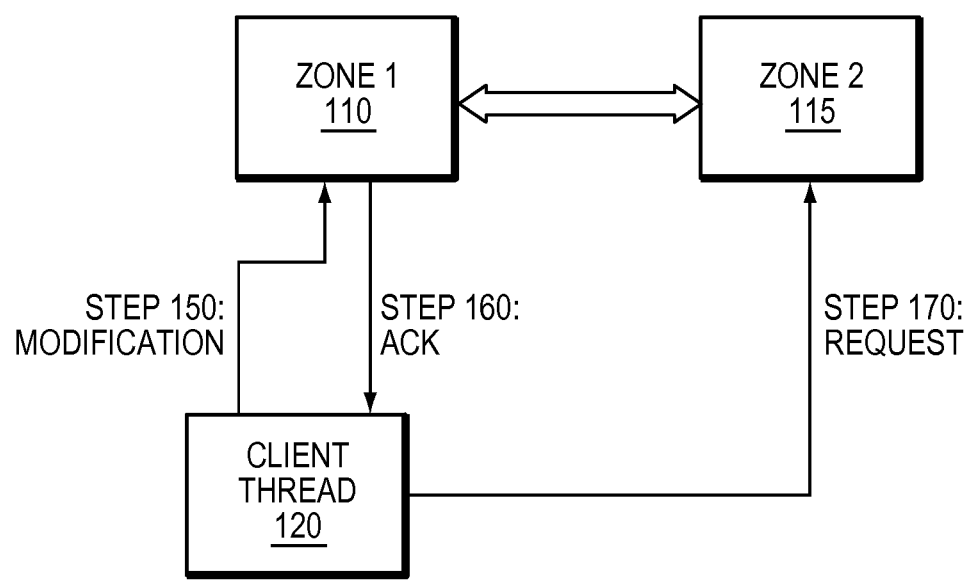
FIG. 1 is a simplified illustration of two zones in a namespace and a client modifying an object in a zone and the object being accessed in another zone, in accordance with an embodiment of the present disclosure.

A computer implemented method, system, and computer program product for enabling strong consistency of unique objects between zones comprising enabling consistency of an unique data object between in zones by switching between consistency techniques to keep the unique data object consistent between the zones; wherein read and write access is enabled to the unique object in the zones.

DETAILED DESCRIPTION OF
EMBODIMENT(S)

Previously, in order to configure federated storage, an end-user who needed distributed storage for their application had to engage IT specialists from multiple silos within their organization, be authorized by multiple entities to acquire resources, and then wait for the resources to be made available. Typically, multiple IT specialists had to configure multiple components, use disparate management tools, manually track parameters being configured (such as WWNs, etc), while communicating needs within their own departments. Conventionally, performing regular configuration tasks in this manner was difficult, error prone, requires intimate knowledge of each component and has to be repeated whenever requirements expand.

Typically, there are problems in keeping an object consistent between two zones. Conventionally, it is problematic to create a global namespace where an object is accessible in two zones. Generally, a problem with zone consistency is that it can be expensive to synchronously update changes in a first zone to a second zone to keep objects synchronized between zones; typically this may be costly in part due to the bandwidth cost to synchronize data between zones. Typically, it may also be costly due to the latency or delay cost of having to wait for the object to be updated in another zone. Conventionally, it is problematic due to extended read times to reach from one zone to another get the latest data if the zones are not synchronized. Usually, it takes 10 times the amount of time to reach between zones to get data than it may be to service a read request within a zone. Typically, a cloud provider may ask customers to pick a zone for a bucket. Generally, a customer whose data spans across zones has to hard partition a namespace upfront into zones. Conventionally, zones are vertical silos, unaware of each other's namespace.

In some embodiments, a namespace may be a network partition were a data object has a unique key or way to be accessed within the namespace. In certain embodiments, consistency may be used to describe the rules used to ensure that a single unique object, exposed in different geographic locations, contains the same data. In some embodiments, different geographic locations may be within a namespace. In at least some embodiments, a unique object presented in different geographic locations within a namespace may be cached at each geographic locations. In many embodiments, strong consistency may ensure that if a unique object is accessed at any geographic location within a namespace the data will be the same regardless of the access location. In an embodiment, weak consistency may not enforce that an unique object is consistent across locations or zones in a namespace. In most embodiments, a unique object may refer to an object that appears to be a single object in multiple locations, although the object may be cached locally at each location. In some embodiments, it may be ensured that regardless to where a read or write occurs to a unique object, the object will appear to have the same information regardless of where it is accessed.

In certain embodiments, the current disclosure may enable a single global namespace that spans across all zones. In most embodiments, a namespace may be accessible in all zones. In an embodiment, an enterprise may have a single file system span across its office locations, which may span a large geographic area. In certain embodiments, employees of the enterprise may have read write access to objects in a particular name space across the world by mounting the a system, such as NFS. In some embodiments, one or more objects may be uploaded in a single bucket from multiple zones. In certain embodiments, data may be written in primary zone and replicated in an asynchronous matter to a secondary zone. In some embodiments, a client may go to a secondary zone and read the data. In at least some embodiments, a system and client may not know if the data is the latest or not. In other embodiments, a mobile agent may upload an object in one zone. In certain embodiments, a read request in another zone may receive an "object-not-found" error. In many of the embodiments herein, two zones are used; however the Applicants realize that the current disclosure may be used with any number of zones.

In certain embodiments, an object may not be present in a zone. In other embodiments, the object may be present but may have not yet replicated to the other zone. In at least some embodiments, a zone may be a data center. In some embodiments, the current disclosure may enable strong consistency between two zones. In many embodiments, it may be desirable to keep an object accessible in both zones up to date in both zones. In most embodiments, zones may be connected by a wide area network. In some embodiments, zones may be located in different geographical areas, such as Boston and Seattle.

In an embodiment, the current disclosure may enable a global namespace across zones. In some embodiments, one or more objects may be available in multiple zones. In many embodiments, the objects may be unique objects. In most embodiments, unique objects may be represented as the same objects in multiple places. In most embodiments, a unique object may be similar to giving multiple locations access to a same physical register. In alternative embodiments, a unique object may be similar to emulating a register in multiple locations. In certain embodiments, synchronous replication may be used to keep objects in zones up to date. In other embodiments, asynchronous replication may be used to keep objects up to date between zones. In further embodiments, a combination of synchronous and asynchronous replication may be used to keep objects up to date between zones. In other embodiments, a combination of synchronous, asynchronous, and other techniques may be used to keep objects up to date between zones. In certain embodiments, a read to a zone may need to determine which zone has the most up to date information.

In certain embodiments, every write transaction in the system may cross WAN and may take a fraction of the second, which can create significant delay for multiple writes. In some embodiments, many of the writes may be reads in the same zone and it may not be efficient to immediately update another zone with a change that will soon be overwritten before another zone accesses that information. In further embodiments, WAN transaction costs between zones may be paid when required. In certain embodiments, if a system can avoid WAN round trip more often than not, there may be a perceptible difference in overall latencies.

In most embodiments, the current disclosure may enable WAN round trips to be avoided. In certain embodiments, the current disclosure may enable a global namespace across zones. In certain embodiments, the current disclosure may enable strong consistency across zones. In may embodiments, the current disclosure may enable minimal WAN interactions for transactions.

In most embodiments, a write to a zone may be performed locally without determining which zone currently has the most up to date information. In certain embodiments, objects in zones may consist of a key value pair. In some embodiments, traffic to a zone may determine what combination of read requests and write requests occur to each object or key value pair in each zone. In an embodiment, if an object experiences mostly writes in a zone, a particular algorithm may be useful to keep it up to date while minimizing traffic across a WAN to another zone. In another embodiment, if an object receives mostly reads, another technique may be useful to minimize WAN traffic to another zone. In further embodiments, a heartbeat with a lease may be used to maintain strong consistency between zones.

In some embodiments, the current disclosure may enable zones to be kept up to date by transparently shifting between synchronous and asynchronous replication of objects between zones. In still further embodiments, the current disclosure may enable zones to be kept up to data by switching between a plurality of synchronization techniques. In some embodiments, the technique used to keep the zones up to date may be chosen by observing the traffic pattern or reads and writes to the zones. In some embodiments, there may be a heartbeat between zones. In at least one embodiment, a heartbeat may indicate whether the zones are able to communicate. In certain embodiments, the heartbeat may be used in combination with a lease.

In certain embodiments, if it is determined that few reads occur to an object in a particular zone, the object may not be updated but may be notified that the object is not up to date. In some embodiments, if an object is not up to date in a zone, a read may be serviced by another zone. In another embodiment, if a read is to occur to an object a heartbeat status may be checked to determine if the object is up to date. In other embodiments, if a read occurs to a zone and a heartbeat has not been received within a period of time, the read may be failed. In some embodiments, if a write occurs to an object in a first zone, the first zone may tell a second zone to invalidate its cache for the object indicating that reads to that object should be serviced from the first zone.

In certain embodiments, zones may have leases for other zones. In at least one embodiment, a lease may be useful in invalidating an object cache. In some embodiments, each key, of a key value pair for an object, may have a set of zones in its property that have stored the most recent version of the key in those zones. In most embodiments, before updating the data of an object the owner may have to send notification to leased zones. In certain embodiments, the notification may update the other zones with the changed information. In certain embodiments, changed information may be meta information or properties of the object. In other embodiments, changed information may be the data of the object itself. In at least one embodiment, there may be a heartbeat between zones that is stopped in case of network partition which may override the requirement to notify other zones that have a lease on the key.

In further embodiments, if a connection between zones is broken, a particular zone may fail read and write requests to an object while another zone may process the read and write requests. In certain embodiments, a first zone may guarantee to a second zone that it may have the most updated value or property of the object unless the first zone notifies the second zone that the value has changed. In most embodiments, upon a change in a first zone, the first zone may notify other zones that a change has occurred. In further embodiments, if there is a break or partition between zones, a secondary zone may return errors to read write operations upon the loss of a heartbeat denoting that the data of the secondary zone may not up to date. In certain embodiments, if a zone is not receiving a heartbeat, the zone may stop sending heartbeats to other zones. In other embodiments, certain synchronization techniques may be applied in a failure free environment. In some embodiments, different synchronization techniques may be applied in an environment where failure may occur.

In some embodiments, an object API may be "Tenant>Bucket>Object>Data Ranges." In certain embodiments, NFS/HDFS may have a file system which may be rooted at the ViPR bucket. In certain embodiments, a file system string may be "Tenant>Bucket>SubDir> . . . >File>Data Ranges.: In other embodiments, a generic structure may be "Tenant> . . . (n levels of parents) . . . >Data Ranges." In an embodiment, a Parent Child Relationship may be given "/a/b.txt." In other embodiments, structure may be stored as key-value pairs. In a particular example, a key pair may be "BucketName". "a"→"aid." In another embodiment, a key value pair may be "aid". "b.txt"→"bid." In certain embodiments, there may be Object/File System On Key-Value. In some embodiments, each entity (subdirectory or file), and its relationships may be stored as individual keys. In certain embodiments, object and file system may sit on top of key/value system. In alternative embodiments, multi-zone access transactions may deal with correctness of key-value system.

A discussion of some types of virtual storage may be found in U.S. Pat. No. 7,206,863, entitled "SYSTEM AND METHOD FOR MANAGING STORAGE NETWORKS AND PROVIDING VIRTUALIZATION OF RESOURCES IN SUCH A NETWORK" issued on Apr. 17, 2007, to EMC Corp, U.S. Pat. No. 7,770,059, entitled "FAILURE PROTECTION IN AN ENVIRONMENT INCLUDING VIRTUALIZATION OF NETWORKED STORAGE RESOURCES" issued on Aug. 3, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK" issued on Jun. 15, 2010, to EMC Corp, U.S. Pat. No. 7,739,448, entitled "SYSTEM AND METHOD FOR MANAGING STORAGE NETWORKS AND PROVIDING VIRTUALIZATION OF RESOURCES IN SUCH A NETWORK USING ONE OR MORE ASICS" issued on Nov. 17, 2009, to EMC Corp, U.S. Pat. No. 7,620,774, entitled "SYSTEM AND METHOD FOR MANAGING STORAGE NETWORKS AND PROVIDING VIRTUALIZATION OF RESOURCES IN SUCH A NETWORK USING ONE OR MORE CONTROL PATH CONTROLLERS WITH AN EMBEDDED ASIC ON EACH CONTROLLER" issued on Nov. 17, 2009, to EMC Corp, U.S. Pat. No. 7,225,317, entitled "SYSTEM AND METHOD FOR MANAGING STORAGE NETWORKS AND FOR MANAGING SCALABILITY OF VOLUMES IN SUCH A NETWORK" issued on May 29, 2007, to EMC Corp, U.S. Pat. No. 7,315,914, entitled "SYSTEMS AND METHODS FOR MANAGING VIRTUALIZED LOGICAL UNITS USING VENDOR SPECIFIC STORAGE ARRAY COMMANDS" issued on Jan. 1, 2008, to EMC Corp, and U.S. Pat. No. 7,216,264, entitled "SYSTEM AND METHOD FOR MANAGING STORAGE NETWORKS AND FOR HANDLING ERRORS IN SUCH A NETWORK" issued on May 8, 2007, to EMC Corp, all of which are hereby incorporated by reference.

Refer now to the example embodiment of FIG. 1. In the example embodiment of FIG. 1, client 120 has made a modification (step 150) to an object in Zone 1 110. Client process or client thread 120 receives an acknowledgement (step 160) that the modification has completed. If client thread 120 makes a request to Zone 2 115 (step 170) to the object modified in Zone 1 110, the effect of the modification should be known in Zone 2 115 to service requests in Zone 2 115 with the modified information.

Figure 2:
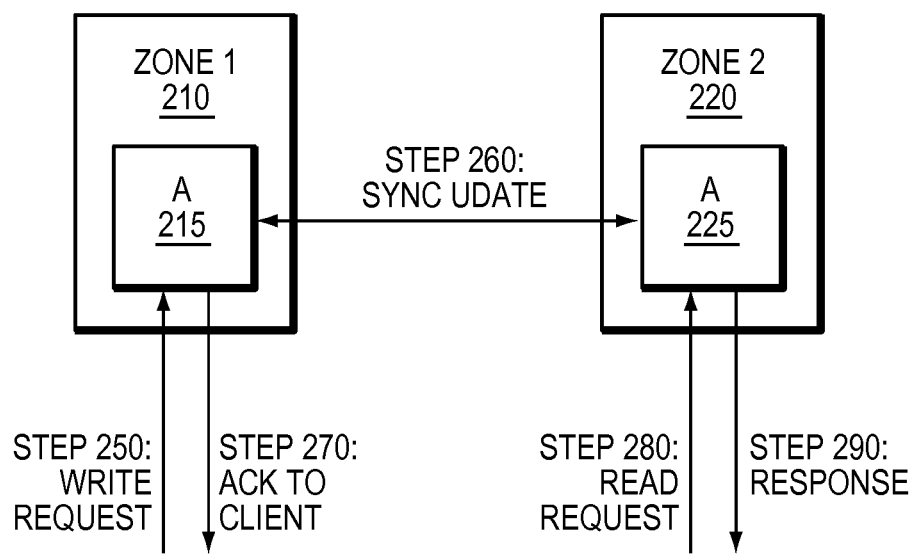
FIG. 2 is a simplified illustration of synchronous updates of two zones in a namespace, in accordance with an embodiment of the present disclosure.

Refer now to the example embodiment of FIG. 2. In the example embodiment of FIG. 2, read requests may be served locally in different Zones as the Zone has guarantee that if there was any update it would know about it. A write read request is made to object A 215 in Zone 1 210 (step 250). The write request to object A 215 in Zone 1 210 is updated to object A 225 in Zone 2 220 (step 260). An acknowledgement that the write request to Zone 1 210 is completed is sent to client that requested the write (step 270). In this example embodiment, the write to object A 215 in Zone 1 is acknowledged after the synchronization of the write to object A 215 is made to object A 225 in Zone 2 220 and confirmed. In this example embodiment a read request to A 225 in Zone 2 220 (step 280) is responded to (step 290) with the current data. In this embodiment, each zone always has the current data of the other zone and an acknowledgement occurs after the data has been updated between zones. In this embodiment, a zone partition may break the ability to update a zone. In this embodiment, there may be a delay in the time to acknowledge a write as the synchronization between zones may need to cross a wide area network (WAN).

Figure 3:
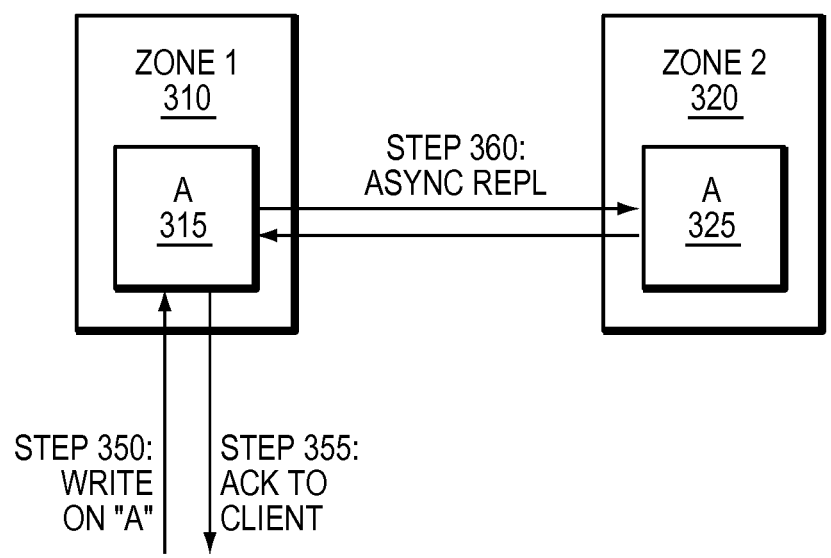
FIG. 3 is a simplified illustration of asynchronous updates of two zones in a namespace, in accordance with an embodiment of the present disclosure.

Refer now to the example embodiment of FIG. 3. In the example embodiment of FIG. 3, there is a write to A 315 in Zone 1 310 (step 350). The write to A 315 is acknowledged to the client that made the write (Step 355). In the background, the change to object 315 is asynchronously replicated to object A 325 in Zone 2 320 (step 360). In this example embodiment, there may not be consistency between Zone 1 310 and Zone 2 320 as any change to a particular zone may not have been transferred to the other zone. In this embodiment, the write may be immediately acknowledged to the client as the write is not immediately synchronized to the other zone.

Figure 4:
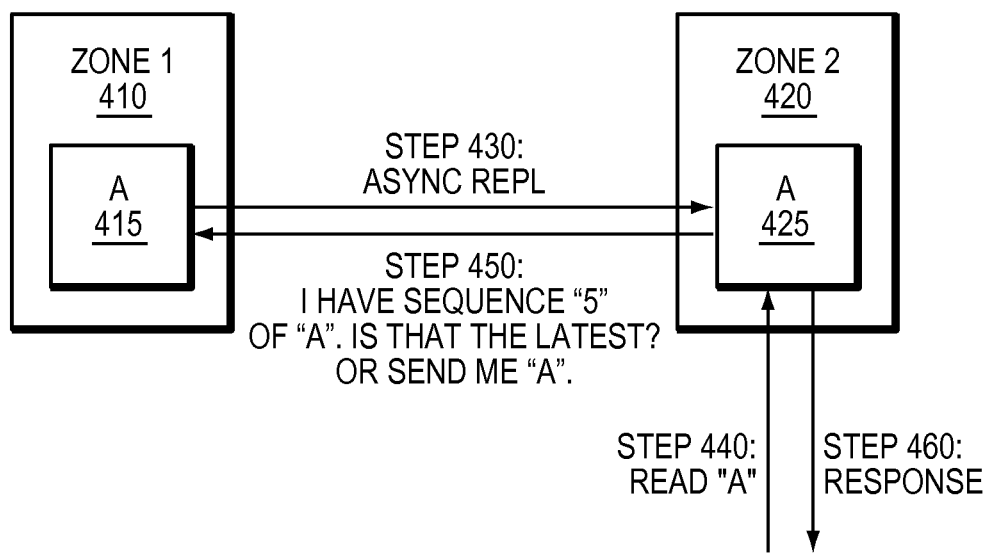
FIG. 4 is a simplified illustration of determining if an object is up to date in a second zone where the zones are asynchronously updated, in accordance with an embodiment of the present disclosure.

Refer now to the example embodiment of FIG. 4. In the example embodiment of FIG. 4, there is asynchronous replication between Zone 1 410 and Zone 2 420. There is a read request for object 425 in Zone 2 420 (step 440). As Zone 2 420 does not know if object A 425 is up to date, Zone 2 420 requests that Zone 1 410 either confirm that Zone 2 420 has the latest information or that Zone 1 410 send the latest information to Zone 2 420 (step 450). Zone 1 410 responds with an acknowledgement that Zone 2 420 has the latest data or provides Zone 2 420 with the latest data (step 450). Zone 2 420 responds to the read request (step 460). In this example embodiment, any particular zone may not know if has the latest data for any request and must always confirm with another zone about the status of the data. In this embodiment, the response to a read may be delayed as the any read request may generate traffic to another zone, which may be across a WAN.

In certain embodiments, it may be beneficial to apply a synchronous approach to updating of an object. In other embodiments it may be beneficial to apply an asynchronous approach to object updating. In further embodiments, it may be beneficial to switch between updating approaches. In still further embodiments, it may be beneficial to have a particular update approach for each key value pair based on the traffic to each of the key value pairs. In yet further embodiments, it may be beneficial to switch between synchronous, a synchronous, and one or more other techniques to keep data between zones up to date.

Figure 5:
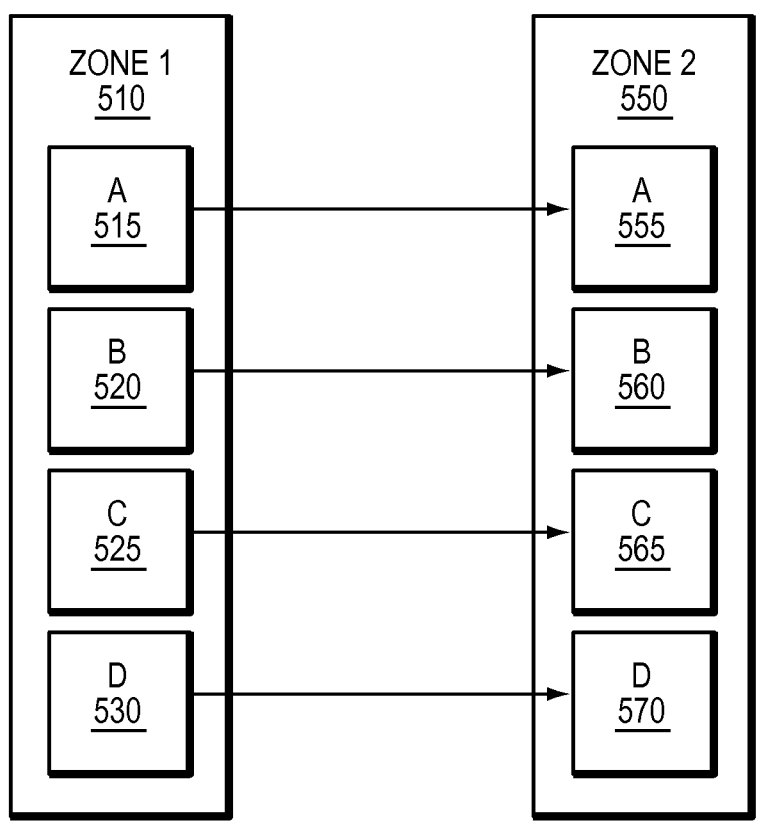
FIG. 5 is a simplified illustration of multiple objects in two zones in a namespace, in accordance with an embodiment of the present disclosure.
Figure 6:
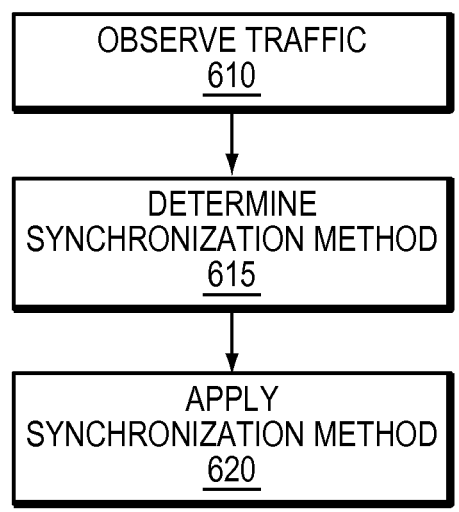
FIG. 6 is a simplified example of a method for determining a synchronization method to be applied across zones, in accordance with an embodiment of the present disclosure.

Refer now to the example embodiment of FIG. 5. In the example embodiment of FIG. 5, there are two zones, Zone 1 510 and Zone 2 550. In this example embodiment, there are objects that exist across Zone 1 510 and Zone 2 555. Object A 515 of Zone 1 510 exists in Zone 2 550 as object A 555. Object B 520 of Zone 1 510 exists in Zone 2 550 as object B 560. Object C 525 of Zone 1 510 exists in Zone 2 550 as object C 565. Object D 530 of Zone 1 510 exists in Zone 2 550 as object D 570. Refer now as well to the example embodiment of FIG. 6. In the example embodiment of FIG. 6, the traffic pattern for each object, such as objects A,B, C, and D, respectively, is observed (step 610). A determination is made what synchronization method is to be applied for each traffic pattern (step 615). The synchronization method is applied for each traffic pattern to keep the objects consistent between zones (step 620).

In a first example, if object A 515/555 has the majority of its traffic to be both reads in Zone 1 515 and reads in Zone 2 550, then it would be beneficial to have each write to object A 515, 555 able to be served locally and a synchronous replication for every write may be executed. In another example, if there are many writes to object B 520/560 in a particular zone, then it would be beneficial to have each write be applied locally and have each read need to determine which zone has the latest data for the read, which would favor asynchronous replication. In other traffic patterns, a determination may be made based on the traffic pattern whether it is better to apply to asynchronous or synchronous replication to keep each object key value up to date. In further embodiments, another technique may be beneficial apply to keep the data updated between zones.

Figure 7:
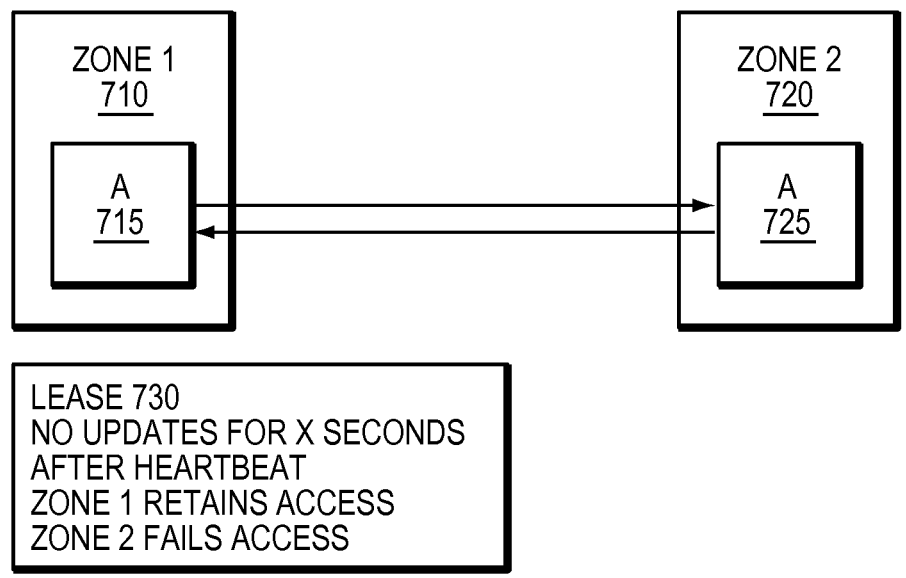
FIG. 7 is a simplified illustration of a lease in two zones in a namespace, in accordance with an embodiment of the present disclosure.
Figure 8:
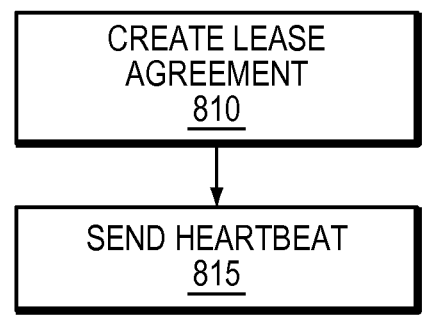
FIG. 8 is a simplified example of a method for creating a lease and sending a heartbeat, in accordance with an embodiment of the present disclosure.

Refer now to the example embodiment of FIG. 7. In the example embodiment of FIG. 7, most writes to object A 715/725 may occur in Zone 1 710 and reads may occur to object A 715/725 in Zone 2 720. Refer now as well to the example embodiment of FIG. 8, Zone 1 710 and Zone 2 720 may enter into a lease agreement such that each Zone may be assured by the other that it will not modify object A 715/725 without notifying the other zone (step 810). Zones 1 710 and Zone 2 720 also send each other a periodic heartbeat to ensure each zone knows that there has not been a network partition between the zones (step 815). If a heartbeat is not received, then a zone may no longer have the assurance that it has the latest data. In these embodiments, a policy in place lets Zone 2 720 service reads knowing that it has the latest data as long as it is receiving heartbeats and has not received a request to invalidate its cache.

In certain embodiments, the lease agreement may also dictate what action is to be taken if a heartbeat has not been received and the zones may assume that a network partition has occurred. In a particular embodiment, the lease agreement may state if there is loss of a heartbeat one zone may retain read/write access to an object while the other zone may fail all access to an object. In some embodiments, a zone may continue to send a heartbeat if it does not receive a heartbeat from other zones. In alternative embodiments, a zone may stop sending heartbeats if it does not receive heartbeats from other zones.

Figure 9:
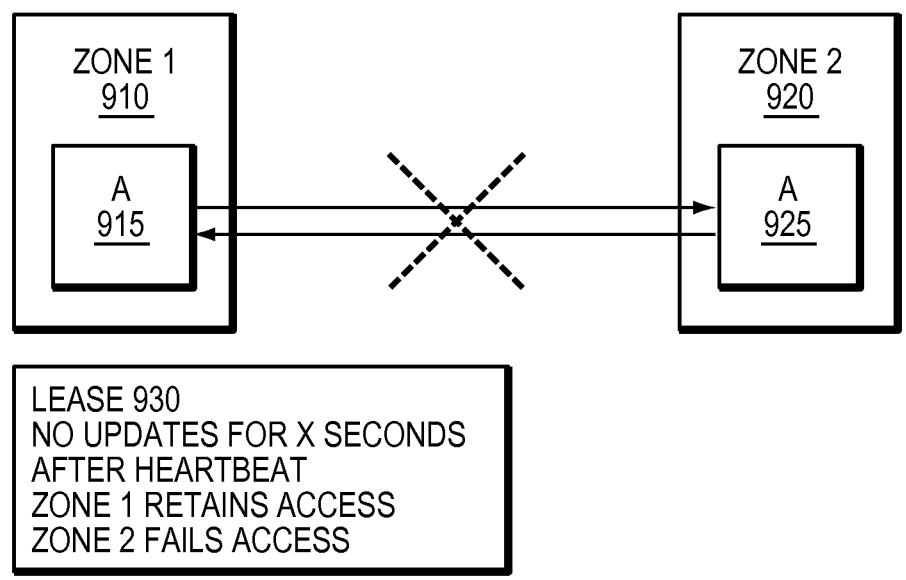
FIG. 9 is an alternative simplified illustration of a lease in two zones in a namespace, in accordance with an embodiment of the present disclosure.
Figure 10:
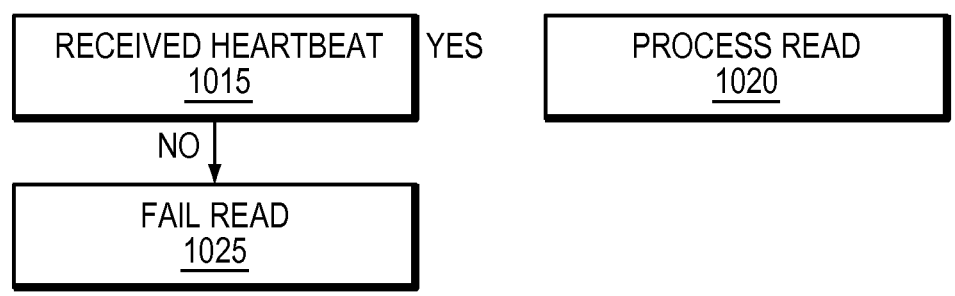
FIG. 10 is a simplified example of a method for processing a read, in accordance with an embodiment of the present disclosure.

Refer now to the example embodiments of FIGS. 9 and 10. In these embodiments, Zone 1 910 and Zone 2 920 have object A 915/925 which is strongly consistent between the zones. Zone 1 910 and Zone 2 920 have entered into lease 930 which dictates what is to happen if there is a partition between Zone 1 910 and Zone 2 925. Zone 2 has a read request for data to object A 925. Zone 2 waits checks for a heartbeat (step 1015). If Zone 2 has received a heartbeat within a predetermined time, this means that the lease is valid on object 925 and that it has the latest data and may process the read request to object A 925 (step 1020). If Zone 2 has not received a heartbeat within the predetermined time, this means the lease has been revoked, such as due to a network partition, and the request to object 925 is failed (step 1025). In certain embodiments, the predetermined time may be a set time. In other embodiments, the predetermined time may be set by observing network traffic. In further embodiments, the predetermined time may be based on knowledge about network failures. In some embodiments, there may be one heartbeat between each zone and multiple leases at a particular zone may use the same heartbeat. In other embodiments, each lease may have a unique heartbeat associated with it for communicating with other zones. In at least one embodiment, each lease may have a different predetermined time for its heartbeat.

Figure 11:
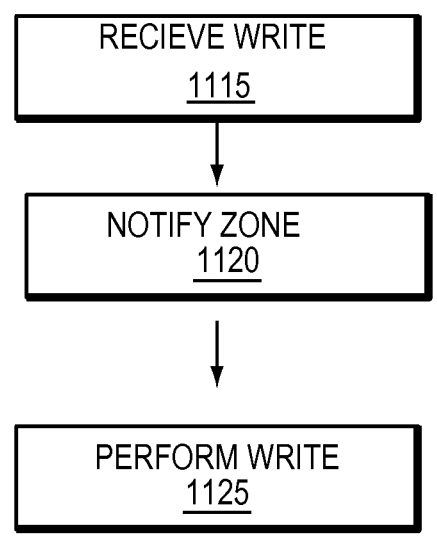
FIG. 11 is a simplified example of a method for processing a write, in accordance with an embodiment of the present disclosure.

Refer now to the example embodiments of FIGS. 9 and 11. In these embodiments, Zone 1 910 and Zone 2 920 have object A 915/925 which is synchronized between the zones to be consistent or have the same data between zones. Zone 1 910 and Zone 2 920 have entered into lease 930 which dictates what is to happen if there is a partition between Zone 1 910 and Zone 2 925. Zone 1 has a request for updating data in object 925. Zone 1 has a lease with Zone 2 to ensure that Zone 2 is notified before the data is changed in Zone 1. Zone 1 receives a write request to object 925 (step 1115). Zone 1 may either stop sending a heartbeat to Zone 2 and wait until the heartbeat period has expired, or send a message to Zone 2 indicating that the object has changed (step 1120). After updating Zone 2 either by notification and an acknowledgement or expiration of the heartbeat period, Zone 1 completes the write (step 1125).

Figure 12:
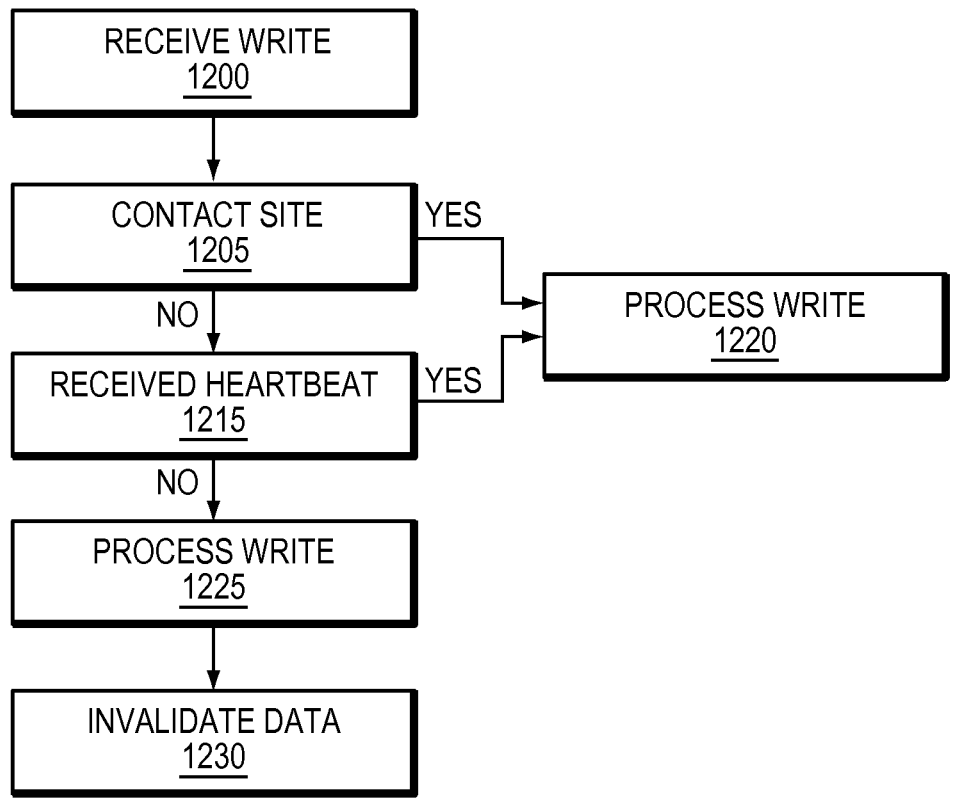
FIG. 12 is an alternative simplified example of a method for processing a write, in accordance with an embodiment of the present disclosure.

Refer now to the example embodiments of FIGS. 9 and 12. In these embodiments, Zone 1 910 and Zone 2 920 have object A 915/925 which is strongly consistent between the zones. Zone 1 910 and Zone 2 920 have entered into lease 930, which dictates what is to happen if there is a partition between Zone 1 910 and Zone 2 925. Zone 1 has a request to write to object 915 (step 1200). Zone 1 910 attempts to contact Zone 2 920 (step 1205). If Zone 1 910 is able to contact Zone 2 920, the write is processed (Step 1220). If Zone 1 910 is unable to reach Zone 2 920, then Zone 1 910 waits until for a heartbeat (step 1215). If Zone 2 receives a heartbeat, Zone 910 performs the write (step 1220). If Zone 1 910 does not receive a heartbeat, then it executes the write (step 1225). By waiting until the expiration of the heartbeat, Zone 2 920 knows that it is no longer guaranteed the latest data and should fail all future read and write requests to object A 925. The data is invalidated in Zone 2 990 as Zone 2 has not received a heartbeat notifying Zone 2 the object is up to date. (step 1230).

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Figure 13:
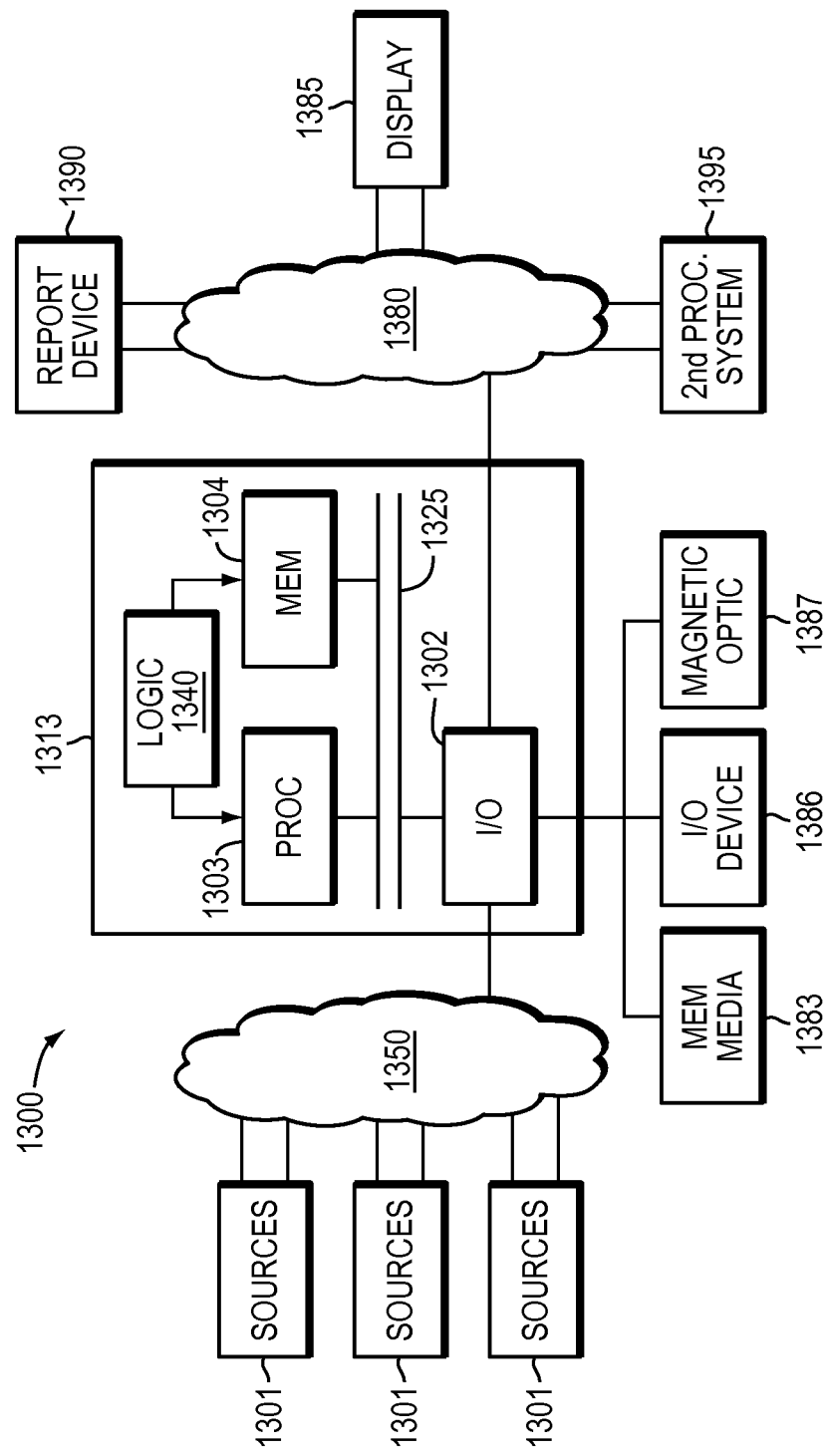
FIG. 13 is an example of an embodiment of an apparatus that may utilize the techniques described herein, in accordance with an embodiment of the present disclosure.
Figure 14:
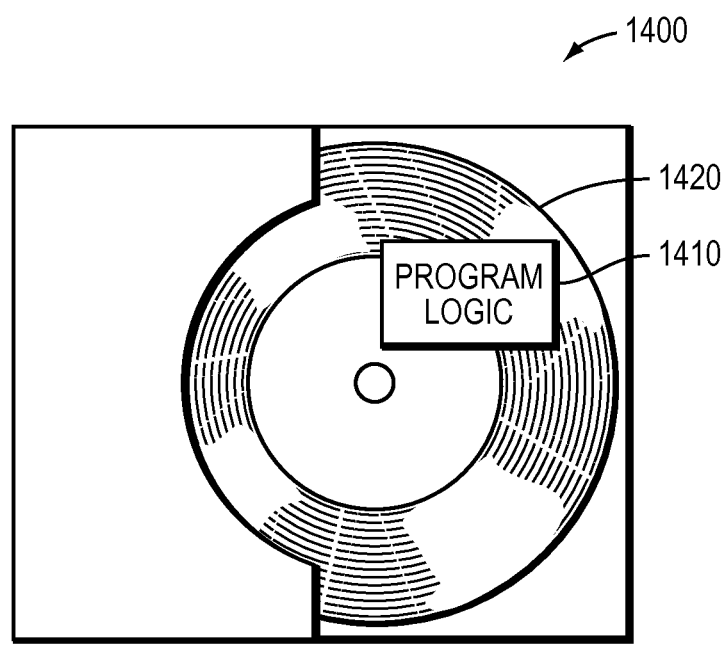
FIG. 14 is an example of an embodiment of a method embodied on a computer readable storage medium that may utilize the techniques described herein, in accordance with an embodiment of the present disclosure.

As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can accessed by a data storage system processor. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 13 the machine becomes an apparatus for practicing the invention. When implemented on one or more general-purpose processors, the program code combines with such a processor 1303 to provide a unique apparatus that operates analogously to specific logic circuits. As such a general purpose digital machine can be transformed into a special purpose digital machine. FIG. 14 shows Program Logic 1434 embodied on a computer-readable medium 1430 as shown, and wherein the Logic is encoded in computer-executable code configured for carrying out the reservation service process of this invention and thereby forming a Computer Program Product 1400. The logic 1434 may be the same logic 1340 on memory 1304 loaded on processor 1303. The program logic may also be embodied in software modules, as modules, or as hardware modules. Processors and computers may be physical and/or virtual processors and computers.

The logic for carrying out the method may be embodied as part of the system described above, which is useful for carrying out a method described with reference to embodiments shown in, for example, FIG. 8 and FIGS. 10-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims. Accordingly, the spirit and scope of the present invention should be limited only by the following claims.

What is claimed is:

1. A computer implemented method-comprising:
    creating strong consistency for a unique data object directly accessible by a client in both of two zones sharing a common file system namespace, each zone representing a different network partition; wherein the unique data object appears to the client to be the same data object in each of the zones; wherein the unique data object has a unique way to be accessed by the client within the file system namespace; wherein strong consistency ensures that if the unique data object is accessed at either zone in the namespace, the data of the unique data object appears to the client to be the same across zones in the namespace whether the unique data object is accessed in a first zone of the two zones or a second zone of the two zones by switching between consistency techniques to keep the unique data object consistent between the two zones; wherein direct read and write access by the client is enabled to the unique data object in each of the two zones; wherein the consistency technique includes rules governing access to the unique data object across the two zones; wherein the consistency techniques include application of synchronous and asynchronous copying of the unique data object from the first zone to the second zone; wherein the consistency techniques include configuring each of the first zone and the second zone to send each other respective first and second periodic heartbeats, each respective periodic heartbeat configured to ensure its respective recipient zone that the respective sender of the respective periodic heartbeat knows that there has not been a network partition between the first and second zones, wherein the first and second respective zones are each assured that each has the latest data as long as each is receiving its respective heartbeat from the other zone; and wherein different techniques are applied to each of the unique data objects being synchronized based on the number of read and write requests to the each object at each zone; and
    determining, based on the consistency techniques, including at least the first and second heartbeats, and in response to a read request to a specified zone, whether the unique data object in the specified zone has the most up to date information; and
    if the specified zone is determined to have the most up to date information, then servicing the read request; and
    if the specified zone is determined not to have the most up to date information, at least one of redirecting the read request to another zone or failing the read request.

2. The method of claim 1 wherein each zone of the zones is a data center and the zones are connected by a wide area connection.

3. The method of claim 1 further comprising:
    observing access requests to a set of unique data objects accessible in the zones;
    determining a synchronization technique for each unique data object in the set of unique data objects;
    based on the determining, applying a synchronous synchronization technique to a first unique data object of the set of unique objects; and based on the determining, applying an asynchronous synchronization technique to a second unique data object of the set of unique data objects.

4. A system comprising:

one or more processors;

zones, including a different storage device at each zone of the zones;

a unique data object stored in the zones; and computer-executable program code operating in memory, wherein the computer-executable program code is configured to cause the one or more processors to execute:

creating strong consistency for the unique data object directly accessible by a client in both of two zones in a file system namespace; wherein the unique data object appears to be the same data object in each of the zones; wherein the unique data object has a unique way to be accessed by the client within the file system namespace; wherein strong consistency ensures that if the unique data object is accessed at either zone in the file system namespace, the data of the unique data object appears to be the same across zones in the namespace whether the unique object is accessed in a first zone of the two zones or a second zone of the two zones by switching between consistency techniques to keep the unique data object consistent between the two zones; wherein direct read and write access by the client is enabled to the unique data object in each of the two zones; wherein the consistency technique includes rules governing access to the unique data object across the two zones; wherein the consistency techniques include application of synchronous and asynchronous copying of the unique data object from the first zone to the second zone; wherein the consistency techniques include configuring the first zone and the second zone to each send each other respective first and second periodic heartbeats, each respective periodic heartbeat configured to ensure that each of the first and second zones knows that there has not been a network partition between the first and second zones and that the respective zone is assured that it has the latest data as long as it is receiving its respective heartbeat from the other zone; and wherein different techniques are applied to each of the unique data objects being synchronized based on the number of read and write requests to the each data object at each zone;

wherein the computer-executable program code further enables one or more processors to execute:

determining, based on the consistency techniques, including at least the first and second heartbeats, and in response to a read request to a specified zone, whether the unique data object in the specified zone has the most up to date information;

if the specified zone is determined to have the most up to date information, then servicing the read request; and if the specified zone is determined not to have the most up to date information, at least one of redirecting the read request to another zone or failing the read request.

5. The system of claim 4 wherein each zone of the zones is a data center and the zones are connected by a wide area connection.

6. The system of claim 5 wherein the program code is further configured to enable the one or more processors to execute:

observing access requests to a set of unique data objects accessible in the zones;

determining a synchronization technique for each unique data object in the set of unique objects;

based on the determining, applying a synchronous synchronization technique to a first unique data object of the set of unique data objects; and based on the determining, applying an asynchronous synchronization technique to a second unique data object of the set of unique data objects.

7. A computer program product comprising:

a non-transitory computer-readable storage medium encoded with computer-executable program code enabling one or more processors to execute:

creating strong consistency for a unique data object accessible by a client in both of two zones in a file system namespace; wherein the unique data object appears to be the same data object in each of the zones; wherein the unique data object has a unique way to be accessed within the file system namespace; wherein strong consistency ensures that if the unique data object is accessed at either zone in the namespace, the data of the unique data object appears to be the same across zones in the file system namespace whether the unique data object is accessed in a first zone of the two zones or a second zone of the two zones by switching between consistency techniques to keep the unique data object consistent between the two zones; wherein direct read and write access by the client is enabled to the unique data object in each of the two zones; wherein the consistency technique includes rules governing access to the unique data object; wherein the consistency techniques include application of synchronous and asynchronous copying of the unique data object from the first zone to the second zone; wherein the consistency techniques include configuring the first zone and the second zone to each send each other respective first and second periodic heartbeats, each respective periodic heartbeat configured to ensure that each of the first and second zones knows that there has not been a network partition between the first and second zones and that the respective zone is assured that it has the latest data as long as it is receiving its respective heartbeat from the other zone; and wherein different techniques are applied to each of the unique data objects being synchronized based on the number of read and write requests to the each data object at each zone;

determining, based on the consistency techniques, including at least the first and second heartbeats, and in response to a read request to a specified zone, whether the unique data object in the specified zone has the most up to date information;

if the specified zone is determined to have the most up to date information, then servicing the read request;

if the specified zone is determined not to have the most up to date information, at least one of redirecting the read request to another zone or failing the read request.

8. The computer product of claim 7 wherein each zone of the zones is a data center and the zones are connected by a wide area connection.

9. The computer product of claim 8 wherein the computer-executable program code further enables one or more processors to execute:

observing access requests to a set of unique data objects accessible in the zones;

determining a synchronization technique for each unique data object in the set of unique objects;

based on the determining, applying a synchronous synchronization technique to a first unique data object of the set of unique objects; and based on the determining, applying an asynchronous synchronization technique to a second unique data object of the set of unique data objects.

10. The computer program product of claim 7 wherein the unique data object has an owner; wherein the owner is in the first zone; wherein the data in the first zone has the most up to date information; wherein the computer-executable program code further enables one or more processors to execute:

establishing a first lease between the first zone and the second zone; wherein the first lease is renewed by a third respective heartbeat and has a first respective lease period;

periodically sending the third respective heartbeat from the first zone to the second zone; wherein the second zone is determined to not have the most up to date data if the second zone has not received the third respective heartbeat within a predetermined period of time; and wherein the second zone is determined to have the most up to date data if the third respective heartbeat is received at the second zone is within the predetermined period of time.

11. The computer program product of claim 10 wherein the computer-executable program code further enables one or more processors to execute:

breaking the first lease between the first zone and the second zone by sending a message from the first zone to the second zone that the first lease is not valid; wherein when the first lease is not valid the determination for the unique object is that the second zone does not have the most up to date information.

12. The method of claim 1 wherein the unique data object has an owner; wherein the owner is in the first zone; wherein the data in the first zone has the most up to date information;

establishing a first lease between the first zone and the second zone; wherein the first lease is renewed by a third respective heartbeat;

periodically sending the third respective heartbeat from the first zone to the second zone; wherein the second zone is determined to not have the most up to date data if the second zone has not received the third respective heartbeat within a predetermined period of time; and wherein the second zone is determined to have the most up to date data if the third respective heartbeat is received at the second zone is within the predetermined period of time.

13. The system of claim 4 wherein the unique data object has an owner; wherein the owner is in the first zone; wherein the data in the first zone has the most up to date information, and wherein the computer-executable program code is further configured to cause the one or more processors to execute;

establishing a first lease between the first zone and the second zone; wherein the first lease is renewed by a third respective heartbeat;

periodically sending the third respective heartbeat from the first zone to the second zone; wherein the second zone is determined to not have the most up to date data if the second zone has not received the third respective heartbeat within a predetermined period of time; and wherein the second zone is determined to have the most up to date data if the third respective heartbeat is received at the second zone is within the predetermined period of time.

14. The system of claim 13, wherein the predetermined period time comprises at least one of:

a fixed period of time;

a period of time dynamically determined based on observations of network traffic in a network where the two zones are operating; and a period of time dynamically determined based on information about at least one failure in a network where the two zones are operating.

15. The system of claim 13, wherein the computer-executable program code is further configured to cause the one or more processors to execute:

breaking the first lease between the first zone and the second zone by sending a message from the first zone to the second zone that the first lease is not valid; wherein when the first lease is not valid the determination for the unique object is that the second zone does not have the most up to date information.

16. The computer program product of claim 10, wherein the predetermined period time comprises at least one of:

a fixed period of time;

a period of time dynamically determined based on observations of network traffic in a network where the two zones are operating; and a period of time dynamically determined based on information about at least one failure in a network where the two zones are operating.

17. The computer program product of claim 12, further comprising:

breaking the first lease between the first zone and the second zone by sending a message from the first zone to the second zone that the first lease is not valid; wherein when the first lease is not valid the determination for the unique object is that the second zone does not have the most up to date information.

18. The computer program product of claim 12, wherein the predetermined period time comprises at least one of:

a fixed period of time;

a period of time dynamically determined based on observations of network traffic in a network where the two zones are operating; and a period of time dynamically determined based on information about at least one failure in a network where the two zones are operating.

19. The method of claim 1, wherein at least one of the first and second zones continues to send its respective first or second heartbeat even if it is not receiving the respective heartbeat from the other of the first and second zones.

20. The method of claim 1, wherein at least one of the first and second zones stops sending its respective first or second heartbeat once it stops receiving the respective heartbeat from the other of the first and second zones.

* * * * *